No. 704,540. Patented July 15, 1902.
R. S. HILL.
CONVEYER.
(Application filed Mar. 24, 1902.)
(No Model.)
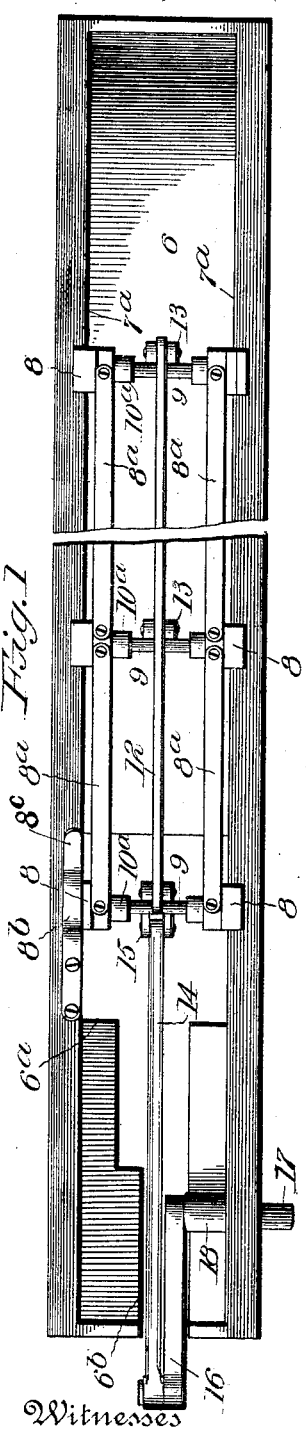
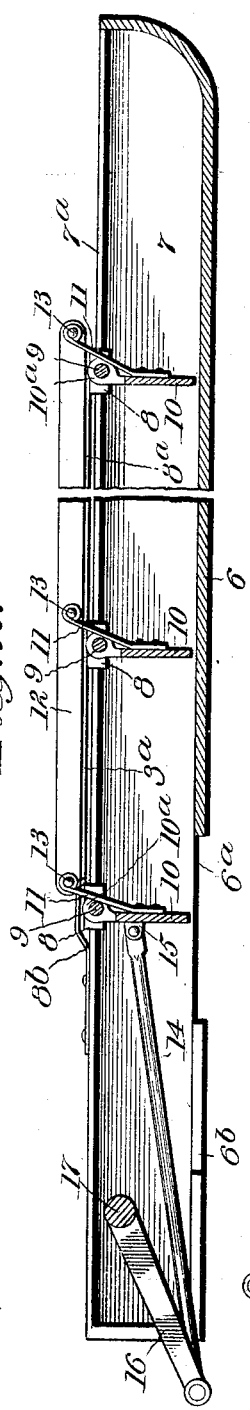
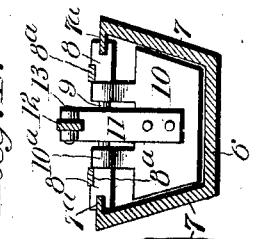
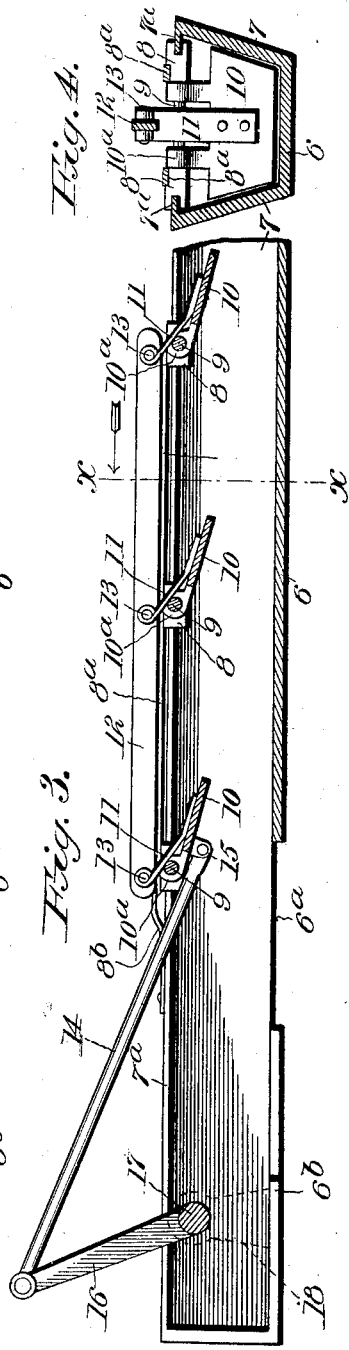
Witnesses
C. H. Walker
Geo. E. Tew
Inventor
Robert S. Hill
by Milo B. Stevens & Co
Attorneys
THE NORRIS PETERS CO., PHOTO-LITHO., WASHINGTON, D. C.

UNITED STATES PATENT OFFICE.

ROBERT S. HILL, OF DETROIT, MICHIGAN.

CONVEYER.

SPECIFICATION forming part of Letters Patent No. 704,540, dated July 15, 1902.

Application filed March 24, 1902. Serial No. 99,711. (No model.)

*To all whom it may concern:*

Be it known that I, ROBERT S. HILL, a citizen of the United States, residing at No. 68 Pleasant avenue, Detroit, in the county of Wayne and State of Michigan, have invented certain new and useful Improvements in Conveyers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to conveyers, and particularly to reciprocating conveyers.

It comprises, essentially, a trough in which the coal or other matter to be conveyed is advanced by means of a number of swinging and sliding flights. The flights are so connected and operated as to lift at the beginning of the backward slide and pass back over the matter in the trough.

An embodiment of the invention is hereinafter described, and is illustrated in the accompanying drawings, in which—

Figure 1 is a top plan view. Fig. 2 is a longitudinal vertical section with the flights at or near the end of the forward stroke. Fig. 3 is a similar section with the flights at the beginning of the backward stroke, and Fig. 4 is a cross-section.

Referring specifically to the drawings, the trough-floor is indicated at 6 and has near the rear end thereof a discharge-opening $6^a$ and an opening $6^b$, in which work the crank and connecting-rod. The sides 7 of the trough are provided at the top thereof with inwardly-projecting guides, on which reciprocate the sliding blocks 8. These blocks are preferably formed in the manner shown in the drawings with grooves in which are embraced the guides and are connected by spacing-bars $8^a$. The blocks receive and support the ends of bars 9, which span the trough and to which the flights 10 are hung by hinges $10^a$. The connecting-bars $8^a$ cause the flights to slide in unison. To cause the flights to swing in unison, a bar 12 is employed, which is hinged, as at 13, to arms 11, bolted to each flight. This bar is preferably located above the pivotal points of the flights, as shown in the drawings, although it will be understood that the flights may be connected by bars attached directly thereto below the pivotal points. The construction shown is preferred, because it leaves the trough clear.

The flights are operated from a revolving shaft 17, driven in any proper manner by a crank 16 and a connecting-rod 14, pivoted, as at 15, to the foremost flight. The shaft extends through a suitable bearing 18, and the crank and connecting-rod work through the opening $6^b$, as above stated.

It will be seen that the flights are caused to swing and also to slide in the trough. On the forward stroke they are thrown down by the pull of the crank on the foremost flight, the movement of which is communicated to the other flights by the rod 12. This action takes place at or before the beginning of the forward slide. When they reach the perpendicular and meet the resistance of the matter in the trough, they slide forward the length of the stroke produced by the crank.

On the backward movement it is essential that the flights first lift clear before they begin to slide back toward the head of the trough. This action will ordinarily take place by the motion of the crank, the force required to turn the flights on their pivots being normally less than that required to slide them; but to insure such action I provide a retaining-spring $8^b$, which comprises a flat piece of metal attached to the top of the trough and so formed and located that it will yieldingly engage the block 8 at the end of the forward stroke. An upturned lip $8^c$ is formed at the front of the spring, against which the block 8 strikes, causing the spring to lift or open to receive the block thereunder, where it is held with a tension sufficient to insure the lifting of the flights before they begin to slide backward. When the flights have lifted, as indicated in Fig. 3, the spring lets go and the flights take their backward slide. By this means they are not dragged over the coal or other matter in the trough on the backward stroke. Also they come down behind the piles of coal on the forward stroke, thereby avoiding danger of breakage by being forced into the coal. The lift and drop of the flights are quick, so that almost all of the throw of the crank is used in the longitudinal slide.

What I claim is—

1. In a conveyer in combination, a trough, guides thereon, sliding blocks embracing the guides, flights swingingly hung from the blocks, connecting-bars between the flights, and means to reciprocate the flights.

2. In a conveyer, in combination, a trough, guide-bars thereon, sliding blocks on the guide-bars, connected flights swingingly hung from the blocks, means to cause the flights to swing and slide, and a spring engaging a block and yieldingly holding the same against the sliding movement.

In testimony whereof I affix my signature in presence of two witnesses.

ROBERT S. HILL.

Witnesses:
CLAUDE B. PEARY,
FRANK L. SCHIEMANN.